Feb. 14, 1928.
J. SPRING
1,659,057
PHONOGRAPH NEEDLE CUP
Filed Aug. 14, 1925
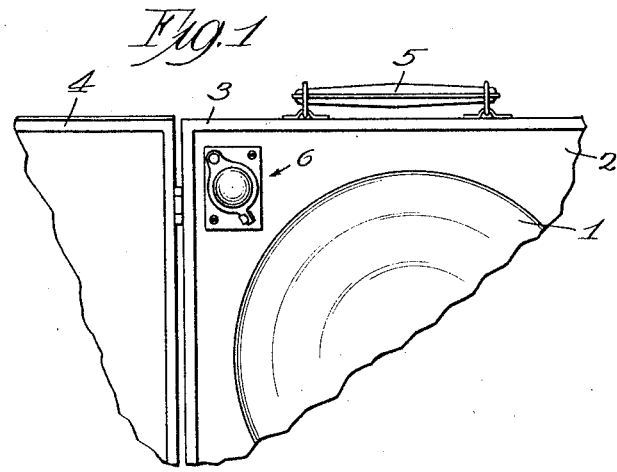
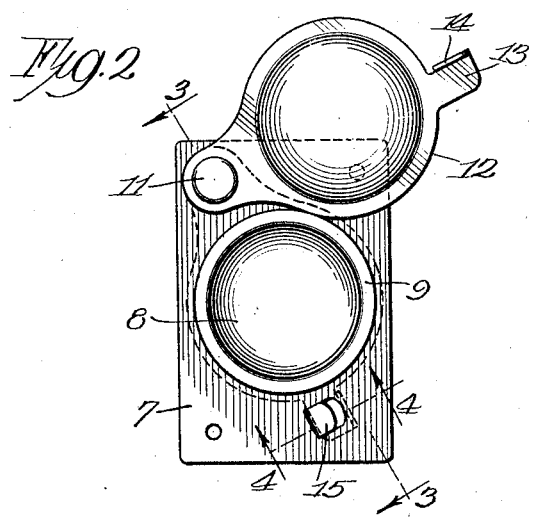
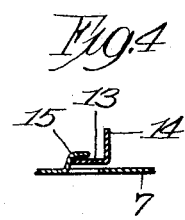
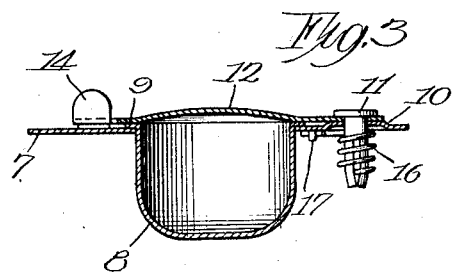
Inventor
Joseph Spring
By Wm. O. Belt Atty.

Patented Feb. 14, 1928.

1,659,057

UNITED STATES PATENT OFFICE.

JOSEPH SPRING, OF CHICAGO, ILLINOIS, ASSIGNOR TO THE BRUNSWICK-BALKE-COLLENDER COMPANY, OF WILMINGTON, DELAWARE, A CORPORATION OF DELAWARE.

PHONOGRAPH-NEEDLE CUP.

Application filed August 14, 1925. Serial No. 50,195.

Phonographs are commonly supplied with one or more receptacles for styluses which are to be used with the phonograph. The styluses become easily displaced from these receptacles, which are in most instances mere shallow cups and find their way into the interior of the phonograph, or become strewn around over the top of the motor board in an unsightly manner. Then when a receptacle is employed with a portable phonograph, the styluses must be removed from the receptacle before the phonograph is moved. This is often forgotten with the result that the styluses are scattered promiscuously throughout the interior of the phonograph. Various covers have been devised for use with receptacles of this type, but none of them to my knowledge has been successful in preventing the working out of the contents of the receptacle. It is therefore the principal object of my invention to provide a stylus receptacle having a cover which will automatically close the receptacle and in said closed position will be locked so as to prevent accidental displacement thereof and so as to prevent the contents of the receptacle from working out therefrom.

A further object of my invention is to provide a receptacle of the above type with a cover which may be easily retained in open position against the action of a spring or the like, which will instantaneously return the cover to closed position upon the release of said retaining means.

Further objects are to provide a receptacle of the above type together with a cover therefor, all of which shall occupy a minimum of space but which shall be easily made from sheet material by standard methods.

In the accompanying drawing in which I have shown a selected embodiment of my invention, Fig. 1 is a fragmentary view of a portion of a portable phonograph having my stylus receptacle applied thereto.

Fig. 2 is an enlarged plan view of my novel and improved stylus receptacle removed from the phonograph the cover being in open position.

Fig. 3 is a section on the line 3—3 of Fig. 2, but showing the cover in closed position.

Fig. 4 is a section on the line 4—4 of Fig. 2, also showing the cover in closed position.

Referring now to the drawing in detail, the numeral 1 designates a turntable mounted above a motor board 2. The phonograph illustrated comprises a suitable casing 3 closed by a cover 4 and provided with a handle 5. It is understood that this structure forms no part of my present invention and is used only as illustrative of a structure with which my invention may be employed. Mounted in any convenient location as in one corner of the motor board 2 is my novel and improved receptacle designated generally at 6. The receptacle, in the form in which I have shown it, comprises a base plate 7 secured to the motor board and having an aperture therein in which is placed a cup 8 having a flange 9 engaging the top surface of the base plate and secured thereto by any suitable means, such as solder.

At one side of the cup the base plate is provided with an upstanding boss 10 which has a central aperture therein to receive a hinge pin 11. Secured to the hinge pin above the boss 10 is the cover 12 of a form and size to close the top of the cup. The cover is provided with a tongue 13 terminating in an upturned finger piece 14, the tongue being received beneath a catch 15 when the cover is in position to close the top of the cup. Surrounding the hinge pin 11 is a coil spring 16 having one end secured to the pin and the other to a lug 17 on the base plate whereby the cover will be urged into position to close the cup. The spring will also tend to hold the cover tightly against the flange 9 of the cup and consequently when the cover is swung to the position shown in Fig. 2, the edge of the cover will readily engage the edge of the flange 9 and hold the cover in open position. A very slight movement of the cover is all that is necessary to release this engagement and then the spring will cause it to snap back to closed position and when in this closed position the catch 15 will prevent any movement of the cover away from the top of the cup. This feature is very important because when my receptacle is employed with a portable machine the weight of the styluses in the cup comes against the cover and in all styles of receptacles known to me styluses are bound to work out from under the cover eventually.

From the above it will be apparent that I have provided a novel and improved stylus receptacle which can be readily and easily made from sheet material by well known manufacturing methods, but which will at the same time be rugged in character and efficient in use. The cover of the receptacle may be easily retained in open position, but it is normally closed by action of the spring 16 and when closed it is locked against movement away from the cup, which movement would result in displacement of the contents of the cup. It will be noted that the cover 12 swings in a plane parallel to the top of the cup, thereby economizing space and making possible a simple means for locking the cover in closed position and for retaining it in open position.

I am aware that changes in the form, construction and arrangement of parts may be made without departing from the spirit and without sacrificing the advantages of the invention and I reserve the right to make all such changes as fairly fall within the scope of the following claim:

I claim:

A stylus receptacle comprising a base plate having an aperture therein, a cup received in said aperture and having a flange engaging the top of said base plate, a cover hinged at one side of said aperture and mounted to swing in a plane parallel to the top of said cup, a spring normally urging said cover into position to close the top of said cup, and a catch preventing movement of said cover out of its plane when in said closed position, said flange being adapted to engage the edge of said cover and hold it in open position.

JOSEPH SPRING.